US012809983B2

(12) United States Patent
Berrangé et al.

(10) Patent No.: US 12,809,983 B2
(45) Date of Patent: Nov. 24, 2026

(54) BOOTING SECURED KERNELS WITH CUSTOMIZABLE COMMAND LINE FUNCTIONALITY

(71) Applicant: RED HAT, INC., Raleigh, NC (US)

(72) Inventors: Daniel Pierres Berrangé, Farnborough (GB); Eric Curtin, Dublin (IE); Francisco Javier Martinez Canillas, Barcelona (ES)

(73) Assignee: Red Hat, Inc., Raleigh, NC (US)

( * ) Notice: Subject to any disclaimer, the term of this patent is extended or adjusted under 35 U.S.C. 154(b) by 147 days.

(21) Appl. No.: 18/460,025

(22) Filed: Sep. 1, 2023

(65) Prior Publication Data

US 2025/0077676 A1 Mar. 6, 2025

(51) Int. Cl.

| | |
|---|---|
| ***G06F 21/57*** | (2013.01) |
| ***G06F 9/4401*** | (2018.01) |
| ***H04L 9/30*** | (2006.01) |
| ***H04L 9/32*** | (2006.01) |

(52) U.S. Cl.

CPC .......... *G06F 21/575* (2013.01); *G06F 9/4403* (2013.01); *H04L 9/3073* (2013.01); *H04L 9/3247* (2013.01); *G06F 2221/034* (2013.01)

(58) Field of Classification Search

None

See application file for complete search history.

(56) References Cited

U.S. PATENT DOCUMENTS

| | | | | |
|---|---|---|---|---|
| 6,128,730 | A * | 10/2000 | Levine | G06F 16/24524 713/1 |
| 11,416,616 | B2 | 8/2022 | Kliewer et al. | |
| 2012/0226895 | A1 | 9/2012 | Anderson et al. | |
| 2020/0401712 | A1* | 12/2020 | Keini | G06F 21/31 |

FOREIGN PATENT DOCUMENTS

| | | | | |
|---|---|---|---|---|
| CN | 104008337 B | * | 8/2019 | G06F 21/566 |

OTHER PUBLICATIONS

Anonymous, "How can I persist kernel options with systemd-boot? ," Sep. 2020, Manjaro (Year: 2020).*

Anonymous, "Glob as the argument of a shell function" May 2021, StackOverflow (Year: 2021).*

(Continued)

*Primary Examiner* — Andrew J Jung

(74) *Attorney, Agent, or Firm* — Kilpatrick Townsend & Stockton LLP

(57) ABSTRACT

Kernels can be securely booted while having customizable command line functionality. For example, a boot loader can initiate a kernel boot using a unified kernel image (UKI) that is cryptographically signed with a cryptographic signature and includes two or more command lines that are protected by the cryptographic signature. The two or more command lines can implement different functionalities with respect to the kernel boot. The boot loader can extract the two or more command lines from the signed UKI. A command line of the two or more command lines can be selected by a user to complete the kernel boot. Once the command line is selected, the boot loader can execute the command line to complete the kernel boot using the command line.

20 Claims, 8 Drawing Sheets

(56) References Cited

OTHER PUBLICATIONS

Bo et. al. "Mechanism to Expedite Boot-Time Debugging", May 1995, IBM Technical Disclosure Bulletin, vol. 38 No. 05 (Year: 1995).*

Extended European Search Report of European application No. 24194802.5 dated Jan. 17, 2025: pp. 1-8.

Anonymous, "Support alternate cmdline entries in UKIs," github.com, systemd / systemd, Issue #24539, Sep. 2, 2022: pp. 1-10, <https://github.com/systemd/systemd/issues/24539>.

Poettering, "Towards Secure Unified Kernel Images for Generic Linux Distributions and Everyone Else," Linux Plumbers Conference 2022, Contribution ID: 201, Sep. 12, 2022: pp. 1-22.

Hoffmann, "Changes/Unified Kernal Support Phase 1," Fedora Project Wiki, retrieved Jun. 21, 2023: pp. 1-4.

Poettering, "Brave New Trusted Boot World," Pid Eins, Oct. 24, 2022: pp. 1-19, <https://0pointer.de/blog/brave-new-trusted-boot-world.html>.

Examination Report issued for European application No. 24194802.5, dated Nov. 11, 2025, pp. 1-6.

* cited by examiner

BOOTING SECURED KERNELS WITH CUSTOMIZABLE COMMAND LINE FUNCTIONALITY

TECHNICAL FIELD

The present disclosure relates generally to a computing environment. More specifically, but not by way of limitation, this disclosure relates to booting secured kernels with customizable command line functionality.

BACKGROUND

To start an operating system of a computing device, a bootloader of the computing device can find a kernel image of a kernel and load the kernel image into memory to initiate a booting process. The computing system may use a signature validation process as a security feature to prevent malicious software from loading during the booting process. The signature validation process can involve confirming that the kernel image being booted is signed by a vendor key trusted by firmware of the computing device. After validating the kernel image using the signature validation process, the bootloader can continue the booting process to initialize hardware components and start the operating system of the computing device.

DETAILED DESCRIPTION

Figure 1:
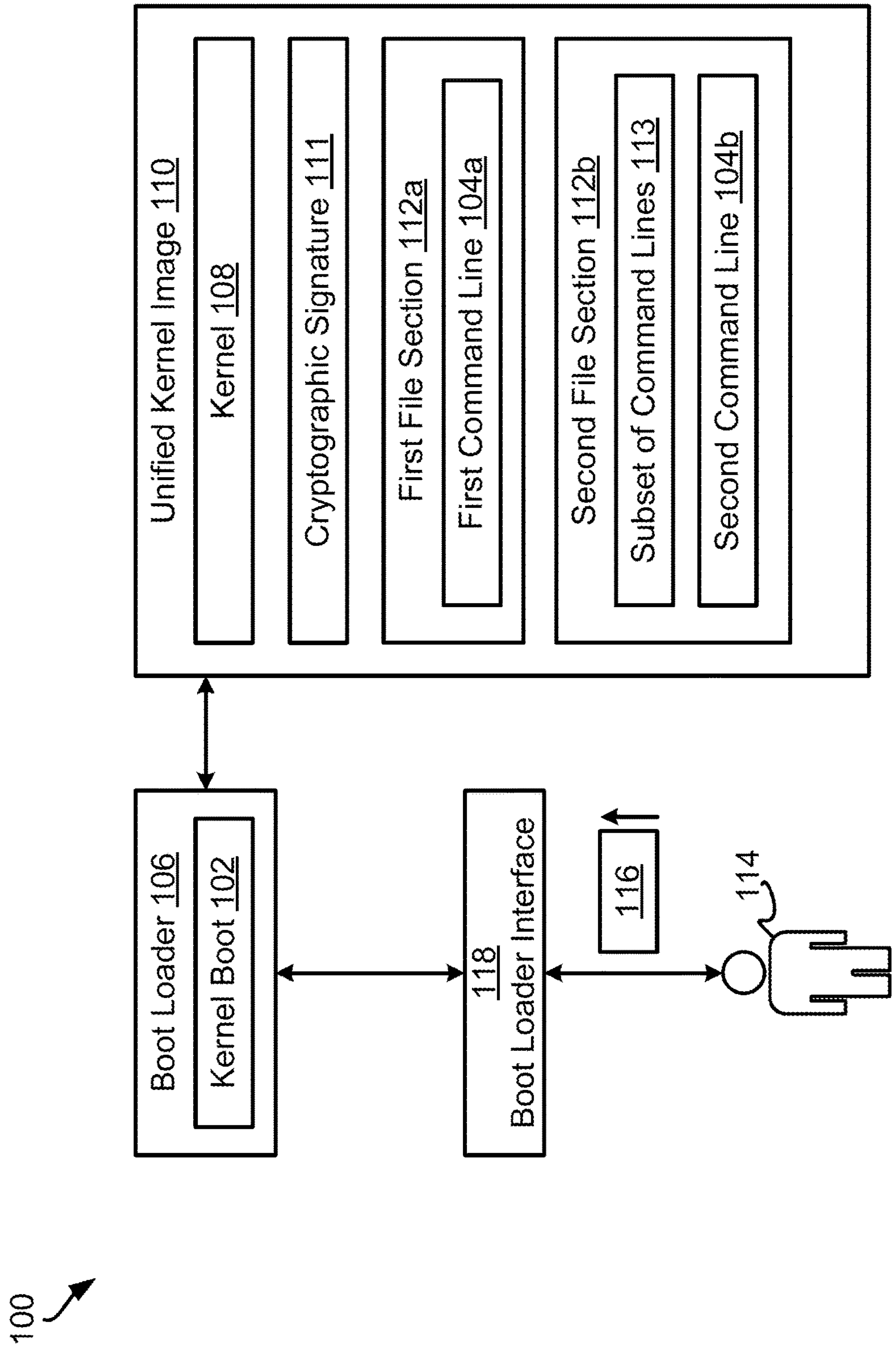
FIG. 1 is a block diagram of an example of a system for a kernel boot with multiple command lines to implement customizable command line functionality according to one example of the present disclosure.

Booting an unsecure kernel can make a computing system vulnerable to malicious actors. To ensure that a kernel is secure, conventional signature validation processes can involve validating the kernel by verifying a signature of the kernel. But, the kernel may include a single command line that is unsigned, thereby exposing the computing system to potential breaches or attacks. Command line arguments of the single command line may not be verified during the signature validation process, leading to opportunities for malicious actors to exploit the kernel to boot undesirable code. Combining the kernel and the command line arguments of the single command line into a unified kernel image that is signed can ensure that the command line arguments are protected by a signature of the unified kernel image that is verified prior to booting the kernel. But, using this version of the unified kernel image can sacrifice operational flexibility or administrative flexibility with respect to the command line arguments. For instance, options for booting the kernel may be limited to the command line arguments of the single command line.

Some examples of the present disclosure can overcome one or more of the issues mentioned above by booting secured kernels with customizable command line functionality. In some implementations, instead of providing the single command line to boot a kernel, the signed unified kernel image may include multiple command lines that each can be executed to perform a different functionality (e.g., default operation, troubleshooting, debugging, etc.). Providing the multiple command lines with different functionalities can enable a user to select a particular command line based on a corresponding functionality, thereby customizing the booting process. Each command line can be defined in the signed unified kernel image such that verifying the signature of the unified kernel image can establish trustworthiness of the command line selected for the kernel boot, thereby increasing security with respect to the command line. Accordingly, providing the multiple command lines can afford operational flexibility while ensuring security associated with the kernel boot.

In additional or alternative implementations, a command line used to boot the kernel can be modifiable to customize the command line and may be covered or protected by the signature of the unified kernel image. For instance, the command line may be customizable by modifying arguments of the command line to create a modified command line that can be executed to perform the kernel boot. Accordingly, the customizable command line can be suitable for unpredictable scenarios that can be specific to an end user deployment. The signed unified kernel image can store an allowlist that can indicate a subset of the arguments of the command line that are permitted to be modified. The signature of the unified kernel image additionally can protect the allowlist to ensure trustworthiness of the allowlist. The allowlist can ensure further security associated with the kernel boot by controlling modify permissions to prevent modifying critical components of the command line.

In some cases, the allowlist additionally can include a list of permitted override values that can indicate allowable values to replace or append to existing values of modifiable arguments in the command line. The boot loader can compare override values stored in a specification file with the list of permitted override values to determine whether the override values are verified or authorized (e.g., part of or associated with the allowable values). If an override value of a modifiable argument is excluded from the list of permitted override values, the boot loader may interrupt or halt the kernel boot to prevent an unauthorized override of the modifiable argument in the command line.

In one particular example, a boot loader of a computing device can initiate a kernel boot using a unified kernel image that includes files to execute the kernel boot. The unified kernel image can be signed with a cryptographic signature to ensure security, for example to prevent unauthorized modifications. The signed unified kernel image can include a command line that is covered or protected by the cryptographic signature to prevent malicious actors from modifying the command line or the kernel boot process. For instance, the unified kernel image can be cryptographically signed using a private key of a public-private key pair. Additionally, the command line can include one or more arguments that can correspond to different functionalities provided by the command line. For instance, the arguments may correspond to debugging, auditing, or other suitable functionalities.

Besides the command line, the signed unified kernel image can include an allowlist that can indicate which arguments of the command line are modifiable arguments. The allowlist can be afforded security protections by the cryptographic signature of the signed unified kernel image due to being included in the signed unified kernel image. Based on the modifiable arguments, the boot loader can determine suitable override values defined in a specification file stored in a boot partition accessible by the boot loader. In some cases, the boot loader may compare an override value of the specification file to a set of permitted override values provided in the allowlist to ensure that the override value is authorized to include in the command line. Once the boot loader confirms that the override value is included in the set of permitted override values, the boot loader can modify a customizable argument of the command line to create a modified command line to execute to complete the kernel boot.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a system 100 for a kernel boot 102 with multiple command lines 104*a-b* to implement customizable command line functionality according to one example of the present disclosure. In some examples, the command lines 104*a-b* can be referred to as kargs. The system 100 can include part of a computing environment associated with a computing device (e.g., a desktop computer, laptop computer, server, mobile phone, or tablet). In some examples, the system 100 can be associated with Unified Extensible Firmware Interface (UEFI). The kernel boot 102 can be initiated by a boot loader 106 (e.g., Grand Unified Boot Loader (GRUB), Low Level Boot Loader (LLB), SYSLINUX, etc.) of the system 100 to begin the kernel boot 102 as a startup process for a kernel 108 of the computing device.

The boot loader 106 can initiate the kernel boot 102 using a unified kernel image 110 that can include the command lines 104*a-b* that are cryptographically signed. The command lines 104*a-b* may be stored as an alphanumeric string in the unified kernel image 110. The unified kernel image 110 can be a single executable component that can include one or more of: a stub loader, the command lines 104*a-b*, microcode, an initial RAM file system (initramfs) image, the kernel 108, or a splash screen. Additionally, the unified kernel image 110 can be signed using a cryptographic signature 111, for example using a private key of a public-private key pair such that the signed unified kernel image 110 can be decrypted or verified using a public key of the public-private key pair. In some examples, the unified kernel image 110 may be cryptographically signed by an external entity (e.g., a vendor, a client, etc.) to enable integrity checking such that the kernel boot 102 is completed only after verifying a chain of trust. By signing the unified kernel image 110 with the cryptographic signature 111, contents (e.g., the command lines 104*a-b*) of the signed unified kernel image 110 can be covered or protected by the cryptographic signature 111 as well. Accordingly, verifying the cryptographic signature 111 of the signed unified kernel image 110 can prevent malicious actors from tampering with critical components of software integral to the computing device.

The signed unified kernel image 110 can include separate file sections 112*a-b* to store each command line. For example, the file sections 112*a-b* can be Portable Executable (PE) file sections. As depicted in FIG. 1, the signed unified kernel image 110 can include a first file section 112*a* to store a first command line 104*a* and a second file section 112*b* to store a subset 113 of the command lines 104*a-b* (e.g., second command line 104*b*). For example, if the signed unified kernel image 110 includes a total of ten command lines, the first file section 112*a* may store the first command line 104*a*, while the second file section 112*b* may store the rest of the command lines (i.e., nine command lines) as the subset 113 of the command lines 104*a-b*.

In some cases, the first command line 104*a* can be a production command line that is a default command line for the computing device to use for the kernel boot 102. The first command line 104*a* being the default command line can ensure backwards compatibility with existing implementations of the kernel boot 102. The second command line 104*b* can provide a different functionality than the first command line 104. For example, the second command line 104*b* may be executed to initiate a troubleshooting process associated with the kernel boot 102. In some examples, if problems arise with the kernel boot 102, a user 114 may select to execute the second command line 104*b* to determine a solution to the problems.

Figure 2:
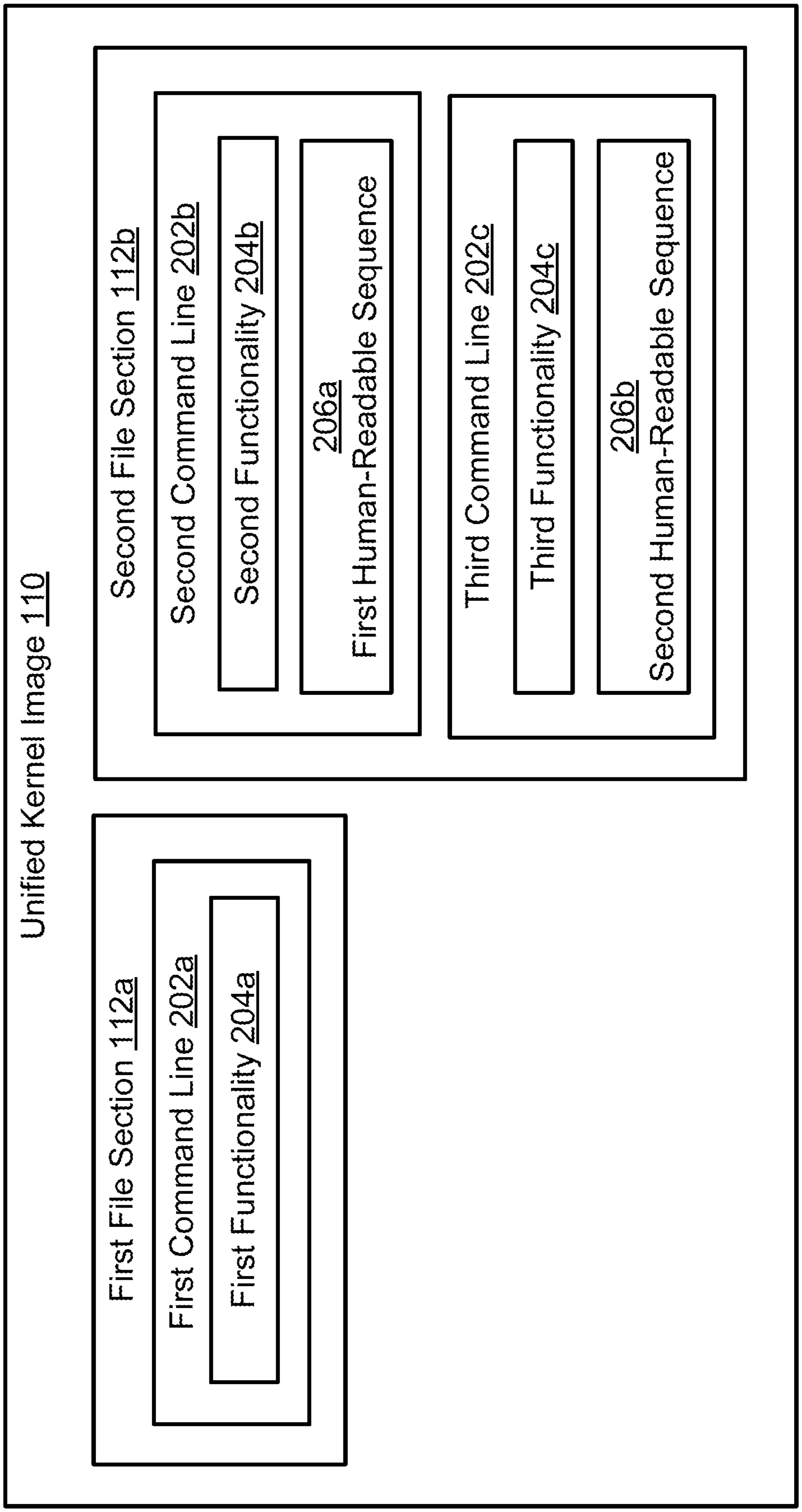
FIG. 2 is a block diagram of an example of a unified kernel image having a first file section including a single command line and a second file section including multiple command lines according to one example of the present disclosure.

In some examples, the signed unified kernel image 110 may only include the first file section 112*a* and the second file section 112*b*. FIG. 2 is a block diagram of an example of the signed unified kernel image 110 having the first file section 112*a* including a single command line and a second file section 112*b* including multiple command lines 202*b-c* according to one example of the present disclosure. Aspects of FIG. 2 are described with respect to components discussed above in FIG. 1. The second file section 112*b* can store a subset of the command lines 202*a-c* provided in the signed unified kernel image 110. The single command line can be the first command line 202*a* having a first functionality 204*a* of being a default option for the kernel boot 102. The second file section 112*b* can include the second command line 202*b* and the third command line 202*c* that each correspond to a different functionality. For example, the second command line 202*b* may provide a second functionality 204*b* associated with modifying user space behavior, while the third command line 202*c* may provide a third functionality 204*c* associated with modifying operating system behavior.

The second file section 112*b* can include a respective human-readable sequence that can describe each of the command lines 202*b-c* of the subset of the command lines 202*a-b* in the unified kernel image 110. For example, the second file section 112*b* can include a first human-readable sequence 206*a* that corresponds to the second command line 202*b* and a second human-readable sequence 206*b* that corresponds to the third command line 202*c*. In some cases, the human-readable sequences 206*a-b* can be arranged in a series with the command lines 202*b-c*. As an example, the series can alternate the human-readable sequences 206*a-b* with the command lines 202*b-c* while include a separator (e.g., a null character) between each data element. Other data formats (e.g., JSON format) are possible. Although FIG. 2 only depicts the second and third command lines 202*b-c* including the human-readable sequences 206*a-b*, it should be understood that the first file section 112*a* can include a suitable human-readable sequence corresponding to the first command line 202*a*. The human-readable sequences 206*a-b* can provide context associated with the command lines 202*b-c* that is suitable to display in a boot loader interface. For example, the user 114 may use the human-readable sequences 206*a-b* to select a suitable command line of the command lines 202*a-c* to execute for the kernel boot 102. The boot loader interface is described in further detail below with respect to FIG. 1.

Figure 3:
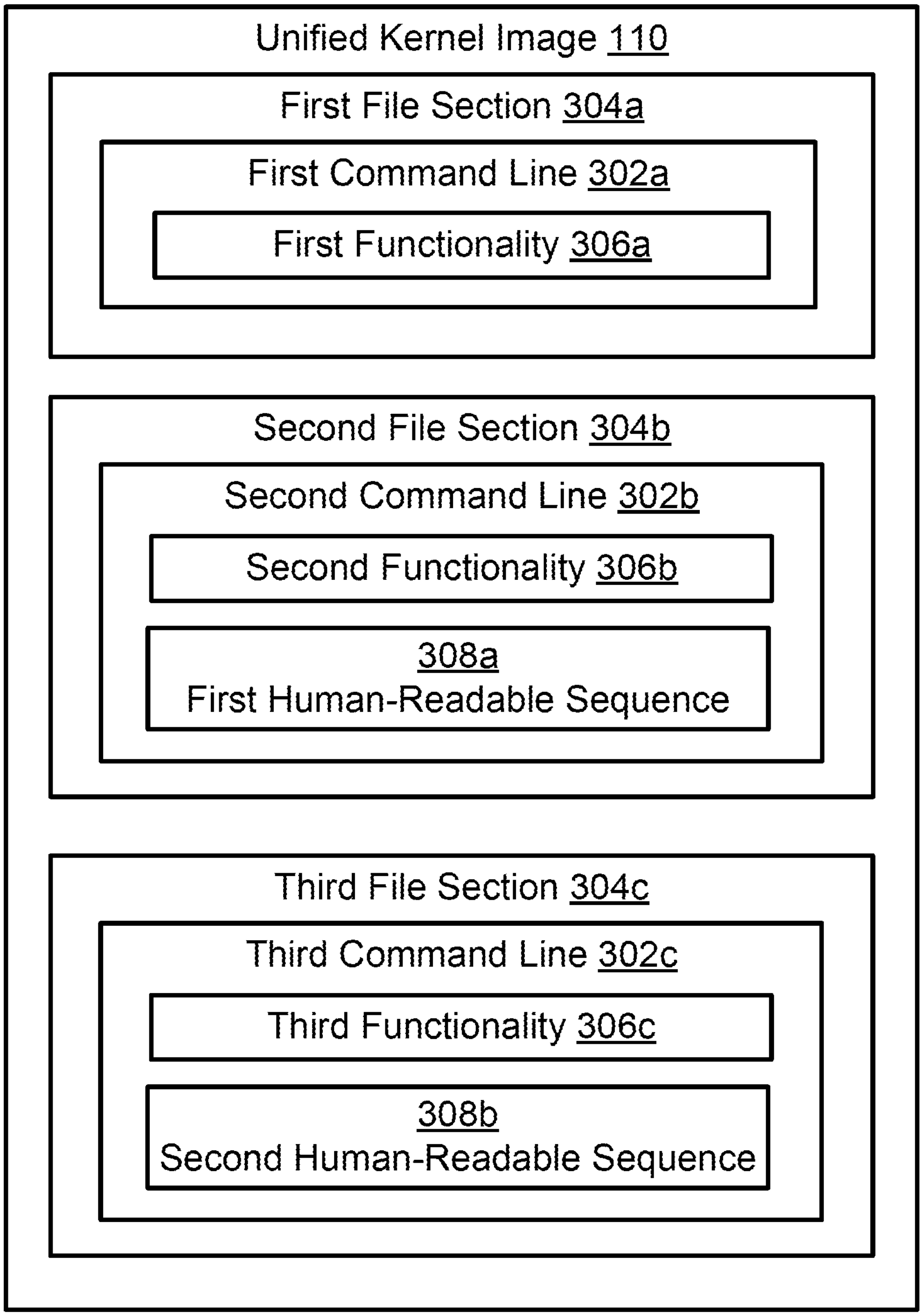
FIG. 3 is a block diagram of an example of a unified kernel image having a respective file section to store each command line according to one example of the present disclosure.

Returning to FIG. 1, in some examples, instead of having only two file sections 112*a-b*, the signed unified kernel image 110 can include a respective file section that is cryptographically signed to store each of the command lines 104*a-b*. For example, as depicted in FIG. 3, a unified kernel image 300 having three command lines 302*a-c* can include three file sections 304*a-c* corresponding to each command line. Aspects of FIG. 3 are described with respect to components discussed above in FIG. 1. Similar to the signed unified kernel image 110 described with respect to FIG. 2, each of the command lines 302*a-c* can be associated with a respective functionality. For example, a first command line 302*a* stored in a first file section 304*a* of the signed unified kernel image 110 can provide a first functionality 306*a* of being a default command line for the kernel boot 102. The second command line 302*b* stored in a second file section 304*b* of the signed unified kernel image 110 can be executed to provide a second functionality 306*b* with debugging capabilities associated with the kernel boot 102. Similarly, the third command line 302*c* stored in a third file section 304*c* of the signed unified kernel image 110 can provide a third functionality 306*c* to enable the boot loader 106 to choose between different device tree settings for the kernel boot 102.

As described above with respect to FIG. 2, the second and third file sections 304*b-c* can include a respective human-readable sequence that describes a respective command line of the file sections 304*b-c*. For example, a first human-readable sequence 308*a* corresponding to the second command line 302*b* can indicate that the second command line 302*b* provides debugging capabilities. In some implementations, the second and third file sections 304*b-c* can store the human-readable sequences 308*a-b* with the command lines 302*b-c* using a data format having null characters as separators. Other data formats (e.g., JSON format) are possible. Although FIG. 3 only depicts the second and third file sections 304*b-c* including the human-readable sequences 308*a-b*, it should be understood that the first file section 304*a* can include a suitable human-readable sequence corresponding to the first command line 302*a*.

Referring back to FIG. 1, when the boot loader 106 initiates the kernel boot 102, the boot loader 106 can extract the command lines 104*a-b* from the file sections 112*a-b* of the signed unified kernel image 110 to provide the command lines 104*a-b* to the user 114. The user 114 then can provide user input 116 received by the boot loader 106 to determine which of the command lines 104*a-b* to execute for the kernel boot 102. Examples of the user input 116 can include mouse clicks, keystrokes, touchscreen input, etc. For example, the user 114 can customize the kernel boot 102 by selecting a suitable command line of the command lines 104*a-b* via a dropdown menu provided by the boot loader interface 118. In some examples, the boot loader 106 can be communicatively coupled to the boot loader interface 118 such that the user 114 can interact with the boot loader interface 118 to provide the user input 116. For example, the boot loader interface 118 may include one or more interface elements (e.g., radio buttons, dropdown menus, etc.) that the user 114 can use to provide the user input 116. After extracting the command lines 104*a-b*, the boot loader 106 can output a respective human-readable sequence corresponding to the command lines 104*a-b* via the boot loader interface 118. The boot loader interface 118 may be coupled to an input device (e.g., keyboard, mouse, touchscreen, etc.) to enable the user 114 to provide the user input 116.

While FIGS. 1-3 depicts a specific arrangement of components, other examples can include more components, fewer components, different components, or a different arrangement of the components shown in FIGS. 1-3. For instance, in other examples, the unified kernel image may include more than three file sections or command lines. Additionally, any component or combination of components depicted in FIGS. 1-3 can be used to implement the process (es) described herein.

Figure 4:
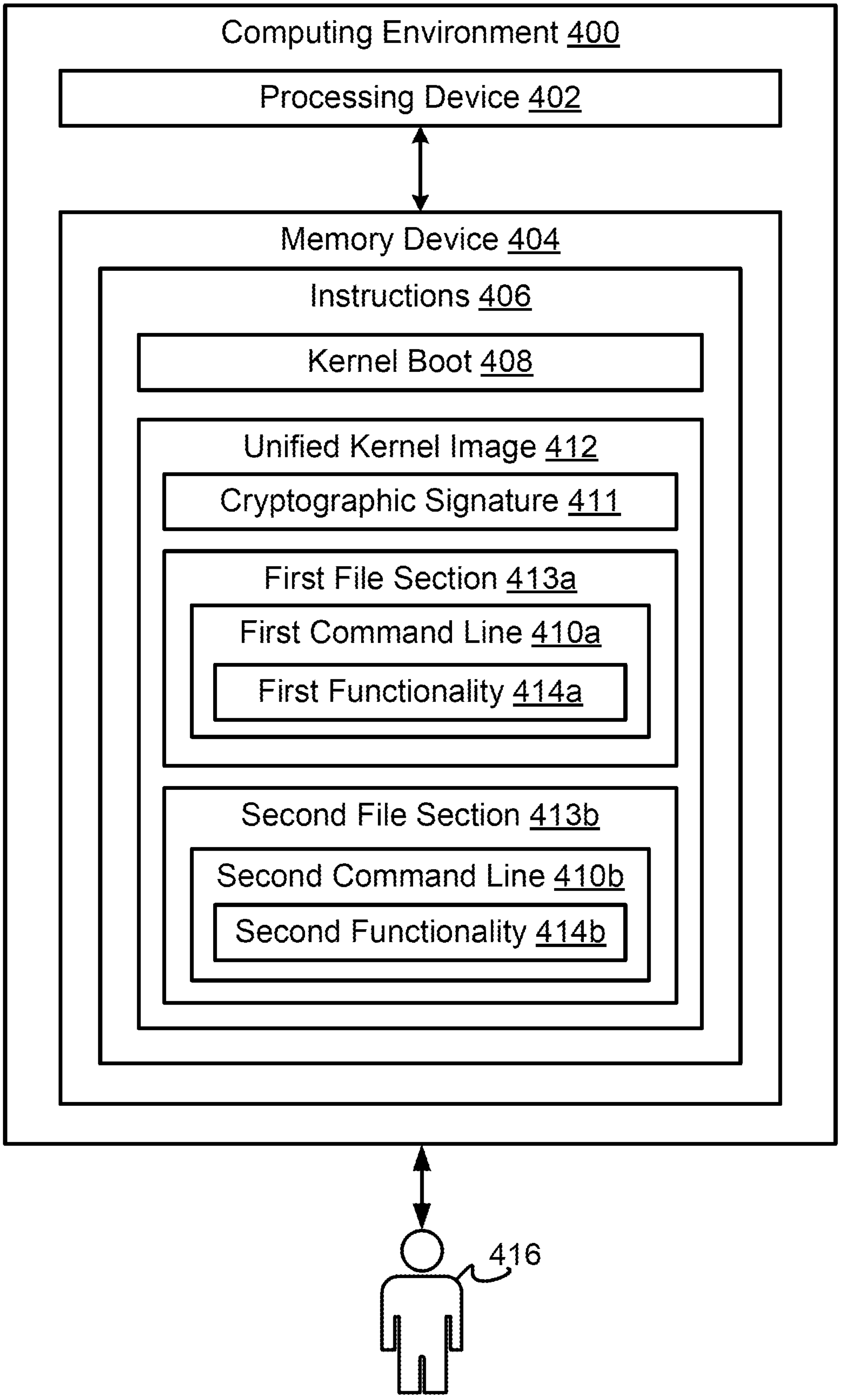
FIG. 4 is a block diagram of an example of a computing environment for a kernel boot with multiple command lines to implement customizable command line functionality according to one example of the present disclosure.

FIG. 4 is a block diagram of an example of a computing environment 400 for a kernel boot 408 with multiple command lines 410*a-b* to implement customizable command line functionality according to one example of the present disclosure. Through protection provided a signed unified kernel image 412, the command lines 410*a-b* can enable flexibility with respect to functionalities provided by the command lines 410*a-b* while avoiding security holes caused by command lines that are vulnerable to unauthorized modifications. The computing environment 400 can include a processing device 402 communicatively coupled to a memory device 404.

The processing device 402 can include one processing device or multiple processing devices. The processing device 402 can be referred to as a processor. Non-limiting examples of the processing device 402 include a Field-Programmable Gate Array (FPGA), an application-specific integrated circuit (ASIC), and a microprocessor. The processing device 402 can execute instructions 406 stored in the memory device 404 to perform operations. In some examples, the instructions 406 can include processor-specific instructions generated by a compiler or an interpreter from code written in any suitable computer-programming language, such as C, C++, C#, Java, Python, or any combination of these.

The memory device 404 can include one memory device or multiple memory devices. The memory device 404 can be non-volatile and may include any type of memory device that retains stored information when powered off. Non-limiting examples of the memory device 404 include electrically erasable and programmable read-only memory (EEPROM), flash memory, or any other type of non-volatile memory. At least some of the memory device 404 includes a non-transitory computer-readable medium from which the processing device 402 can read instructions 406. A computer-readable medium can include electronic, optical, magnetic, or other storage devices capable of providing the processing device 402 with the instructions 406 or other program code. Non-limiting examples of a computer-readable medium include magnetic disk(s), memory chip(s), ROM, random-access memory (RAM), an ASIC, a configured processor, and optical storage.

In some examples, the processing device 402 can initiate the kernel boot 408 using a unified kernel image 412 that includes two or more command lines 410*a-b*. The unified kernel image 412 can be cryptographically signed using a cryptographic signature 411 such that the command lines 410*a-b* are covered or protected by the cryptographic signature 411. The command lines 410*a-b* can be stored in separate file sections. For example, a first command line 410*a* may be stored in a first file section 413*a* of the signed unified kernel image 412, while a second command line 410*b* may be accessible via a second file section 413*b* of the signed unified kernel image 412. The kernel boot 408 can be used to initiate an operating system (e.g., Linux, IOS, Android, etc.) of the computing environment 400. For example, the kernel boot 408 may be initiated after powering on a computing device associated with the computing environment 400. The command lines 410*a-b* can implement different functionalities 414*a-b* with respect to the kernel boot 408, thereby enabling dynamic behavior associated with the kernel boot 408.

To boot a kernel (e.g., the kernel 108 of FIG. 1) of the signed unified kernel image 412, the processing device 402 can extract the command lines 410*a-b* from the signed unified kernel image 412. A first command line 410*a* or a second command line 410*b* of the signed unified kernel image 412 may be selected by a user 416 to complete the kernel boot 408. Once the user 416 selects a suitable command line of the command lines 410*a-b*, the processing device 402 can execute the suitable command line to complete the kernel boot 408 using the suitable command line. For example, during normal operation, the processing device 402 may execute the first command line 410*a* as a default command line for the kernel boot 408.

Figure 5:
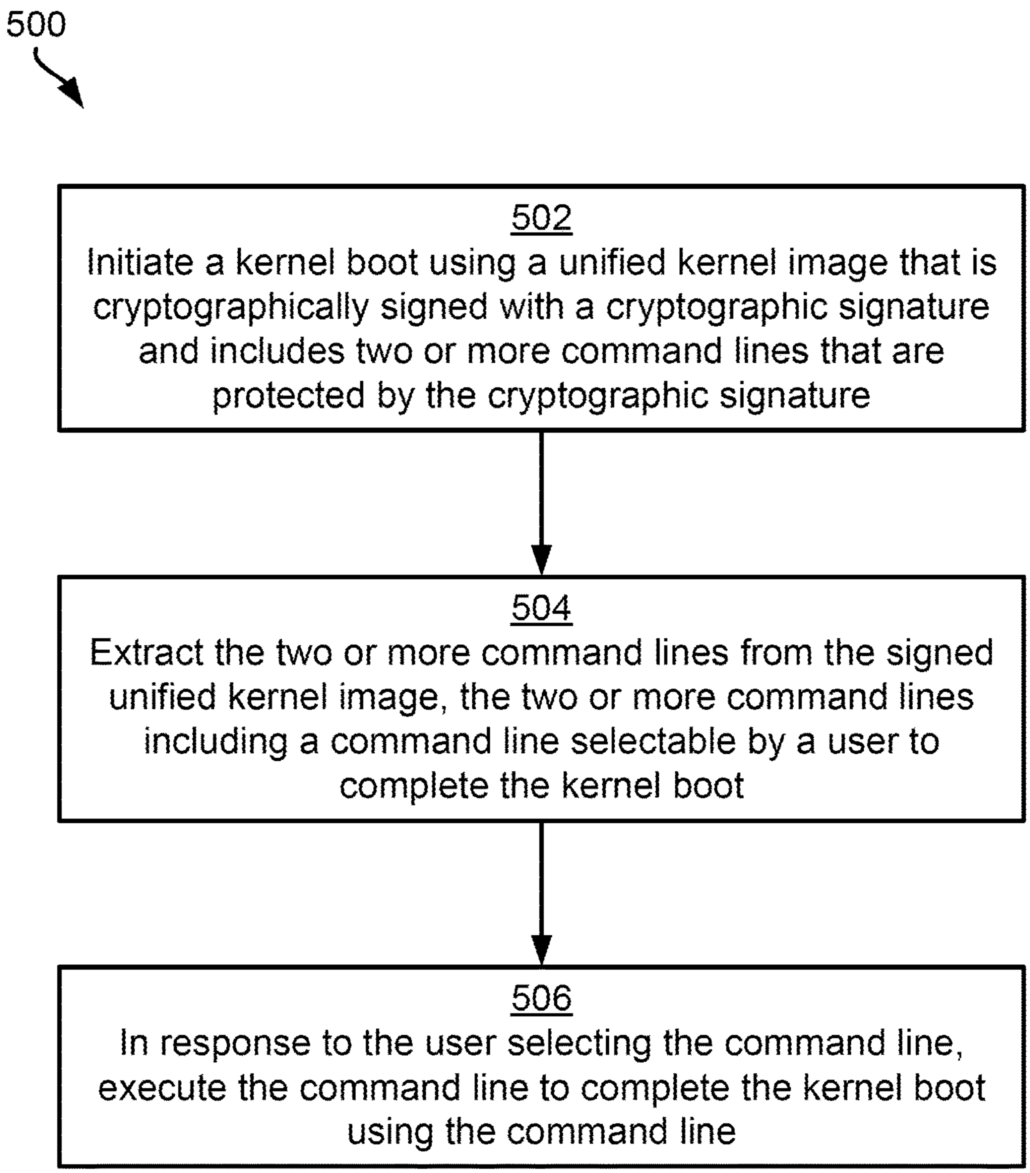
FIG. 5 is a flowchart of a process for a kernel boot with multiple command lines to implement customizable command line functionality according to one example of the present disclosure.

FIG. 5 is a flowchart of a process 500 for a kernel boot 408 with multiple command lines 410*a-b* to implement customizable command line functionality according to one example of the present disclosure. In some examples, the processing device 402 can perform one or more of the steps shown in FIG. 5. In other examples, the processing device 402 can implement more steps, fewer steps, different steps, or a different order of the steps depicted in FIG. 5. The steps of FIG. 5 are described below with reference to components discussed above in FIGS. 1-4.

In block 502, the processing device 402 initiates the kernel boot 408 using a unified kernel image 412 that includes two or more command lines 410*a-b*. The unified kernel image 412 can be cryptographically signed with a cryptographic signature 411, for example using asymmetric cryptography, symmetric cryptography, or other suitable encryption techniques. The cryptographic signature 411 of the signed unified kernel image 412 can protect the command lines 410*a-b*, for example to prevent malware from interfering with the command lines 410*a-b*. Accordingly, protection afforded by coverage of the cryptographic signature 411 can increase security of the command lines 410*a-b*. If the processing device 402 detects a problem (e.g., a corrupted component), the processing device 402 can refuse to complete the kernel boot 408. In some cases, the processing device 402 additionally may output an alert to notify a user 114 that the kernel boot 408 has failed.

The command lines 410*a-b* can implement different functionalities with respect to the kernel boot 408. For example, the processing device 402 may execute a first command line 410*a* as a default command line during normal processes. In some examples, if the user 114 is notified about the problem, the processing device 402 then may receive user input 116 to execute a second command line 410*b* to initiate a troubleshooting process. In such examples, the second command line 410*b* may include debugging, diagnosis, or self-healing capabilities to identify the problem and determine a solution to address the problem.

In block 504, the processing device 402 extracts the command lines 410*a-b* from the signed unified kernel image 412. For example, the processing device 402 may extract the first command line 410*a* from a first file section 413*a* of the signed unified kernel image 412. Similarly, the processing device 402 can obtain the second command line 410*b* from a second file section 413*b* of the signed unified kernel image 412. Additionally, the command lines 410*a-b* can include a command line selected by the user 114 to complete the kernel boot 408. In some examples, the command line may be the first command line 410*a*. In other examples, the command line can be the second command line 410*b*.

In block 506, in response to the user 114 selecting the command line, the processing device 402 executes the command line of the command lines 410*a-b* to complete the kernel boot 408 using the command line. The processing device 402 can determine the command line to complete the kernel boot 408 at least in part using the user input 116 provided by the user 114. In some examples, the processing device 402 can receive the user input 116 via a boot loader interface 118 that can display the command lines 410*a-b* to the user 114. In some cases, human-readable sequences 206*a-b* corresponding to the command lines 202*b-c* can be displayed using the boot loader interface 118 to provide description regarding the command lines 410*b-c*.

Figure 6:
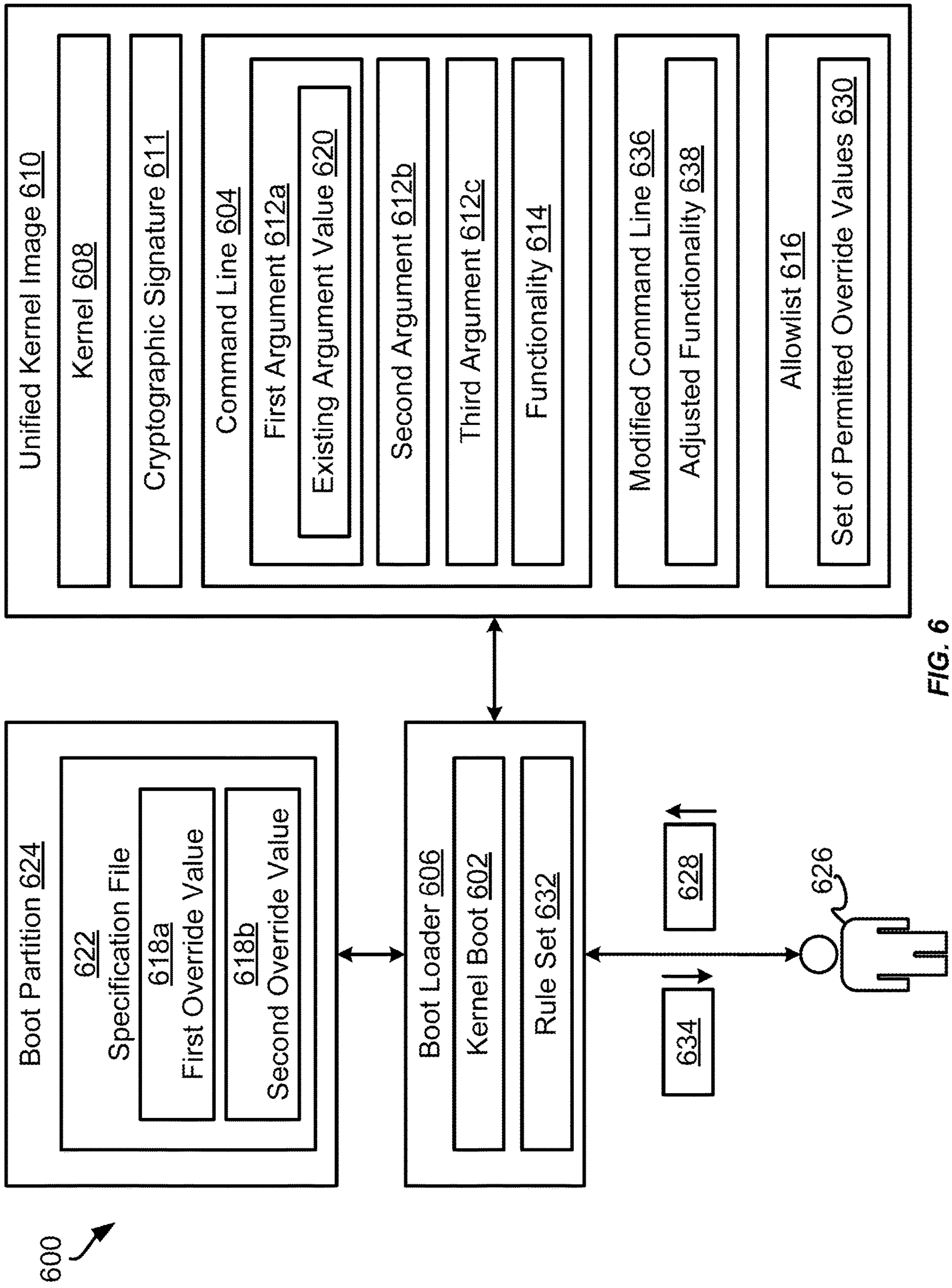
FIG. 6 is a block diagram of an example of a system for a kernel boot using a customizable command line to implement customizable command line functionality according to one example of the present disclosure.

FIG. 6 is a block diagram of an example of a system 600 for a kernel boot 602 using a customizable command line 604 to implement customizable command line functionality according to one example of the present disclosure. The system 600 can include part of a computing environment associated with a computing device (e.g., a desktop computer, laptop computer, server, mobile phone, or tablet). In some examples, the system 600 can be associated with Unified Extensible Firmware Interface (UEFI). The kernel boot 602 can be initiated by a boot loader 606 (e.g., Grand Unified Boot Loader (GRUB), Low Level Boot Loader (LLB), SYSLINUX, etc.) of the system 600 to begin the kernel boot 602 as a startup process for a kernel 608 of the computing device.

The boot loader 606 can initiate the kernel boot 602 using a unified kernel image 610 that can include the command line 604. The unified kernel image 610 can be cryptographically signed with a cryptographic signature 611 to prevent unauthorized modification by malicious actors. Because the command line 604 is included as part of the signed unified kernel image 610, protections afforded by the cryptographic signature 611 can cover the command line 604. The command line 604 can include one or more arguments 612*a-c* corresponding to at least one functionality 614 of the command line 604. The signed unified kernel image 610 can include an allowlist 616 indicating a portion of the arguments 612*a-c* that are permitted to be altered by deployments. The cryptographic signature 611 can additionally cover the allowlist 616 to afford security protections, for example to prevent unauthorized modifications. When initiating the kernel boot 602, the boot loader 606 can check for the allowlist 616 to determine whether to enable modifications to the command line 604. The allowlist 616 can be stored in a signed file section (e.g., the file sections 112*a-b* of FIG. 1), thereby preventing unauthorized changes to the allowlist 616. As another example, if the system 600 involves a mobile device, the allowlist 616 may be stored in a device tree blob that describes hardware components of a particular computing device. In some cases, the allowlist 616 can include a list of argument names corresponding to modifiable arguments of the arguments 612*a-c*. For example, the boot loader 606 may use the allowlist 616 to determine that a first argument 612*a* and a second argument 612*b* are modifiable arguments 612*a-b*, while a third argument 612*c* is an unmodifiable argument. In some implementations, the list of argument names may be separated using null characters or other suitable separators.

In some examples, the modifiable arguments 612*a-b* may accept one or more override values 618*a-b* to modify or alter the modifiable arguments 612*a-b*. As an example, an existing argument value 620 of the first argument 612*a* may be replaced with a first override value 618*a*. In some cases, the override values 618*a-b* can be provided in a specification file 622 stored in a boot partition 624 (e.g., a VFAT partition) accessible by the boot loader 606. In other cases, if the system 600 involves a mobile device, the override values 618*a-b* may be defined in a Device Tree Blob Overlay (DTBO) that can be stored in a verified partition of the mobile device. In some examples, the override values 618*a-b* can include a series of alphanumeric characters (e.g., 'ttyS0' or 'tty0') inputted at least in part by a user 626 as part of user input 628. For example, the specification file 622 can be modified or written using the user input 628, enabling the override values 618*a-b* to be created.

In some cases, the allowlist 616 additionally can include a list of permitted override values 630 to indicate allowable values to modify the modifiable arguments 612*a-b*. The boot loader 606 can compare the override values 618*a-b* of the specification file 622 to the list of permitted override values 630 to determine whether the override values 618*a-b* are allowable. As an example, if the override values 618*a-b* are included in the list of permitted override values 630, the override values 618*a-b* can be considered allowable and can be appended to the command line 604. In some implementations, determining that the override values 618*a-b* are included in the list of permitted override values 630 can involve using a rule set 632. Rather than applying an exact string match, the rule set can enable wildcard matching of the override values 618*a-b* and the list of permitted override values 630, for example to cover a set of valid patterns. The wildcard matching can include glob matches or regular expression matches.

As another example, if the override values 618*a-b* are excluded from the list of permitted override values 630, the override values 618*a-b* may be considered unauthorized. Accordingly, the boot loader 606 may prevent unauthorized override values from being appended to the command line 604, for example by ignoring the unauthorized override values. Additionally, or alternatively, the boot loader 606 may output an alert 634 to notify the user 626 or other suitable entities (e.g., an administrator) about malfunctions or abnormal events. In this case, the alert 634 outputted by the boot loader 606 can indicate that the unauthorized override values are present in the specification file 622. The alert 634 then may result in a failure of the kernel boot 602. Rebooting the kernel 608 may occur after the failure of the kernel boot 602, for example using a different specification file with different override values.

In some examples, the first override value 618*a* may correspond to the first argument 612*a*, while the second override value 618*b* may correspond to the second argument 612*b*. In such examples, the first argument 612*a* and the second argument 612*b* may be included in the list of permitted override values 630. In some cases, the boot loader 606 can determine that the first override value 618*a* is incompatible with the second override value 618*b*, for example using the list of permitted override values 630. Subsequently, the boot loader 606 can output the alert 634 to indicate that the first override value 618*a* is incompatible with the second override value 618*b*. Similar to when the override values 618*a-b* are unauthorized, the alert 634 can result in the failure of the kernel boot 602.

Once the override values 618*a-b* are verified, the boot loader 606 can add the override values 618*a-b* to the command line 604, creating a modified command line 636. Due to modifying the modifiable arguments 612*a-b* of the command line 603, the boot loader 606 can adjust the functionality 614 of the command line 604 to become an adjusted functionality 638 corresponding to the modified command line 636. To complete the kernel boot 602, the boot loader 606 can execute the modified command line 636, thereby implementing the adjusted functionality 638. As an example, the existing argument value 620 of the first argument 612*a* may corresponding to a specific parameter (e.g., a serial port, a graphical console, etc.) defined for a graphics card of the system 600. By replacing the existing argument value 620 with the first override value 618*a*, the boot loader 606 can adjust the specific parameter of the graphics card.

In some examples, the unified kernel image 610 may be a combination of the unified kernel image 610 described above with respect to FIG. 6 and the unified kernel image 110 of FIGS. 1-3. For example, referring to FIG. 2, the second file section 112*b* of the signed unified kernel image 110 may include a customizable command line (e.g., the command line 604 of FIG. 6) as the second command line 202*b*. In such examples, the boot loader 106 can determine that the second command line 202*b* is modifiable by identifying that an allowlist (e.g., the allowlist 616 of FIG. 6) is available in the signed unified kernel image 110. Thus, the user 114 can select the first command line 202*a* or modify the second command line 202*b* to complete the kernel boot 102. Having both options can further improve operational flexibility for the kernel boot 102 while still ensuring that the command line executed by the boot loader 106 is secure (e.g., protected by the cryptographic signature 111 of the signed unified kernel image 110).

Figure 7:
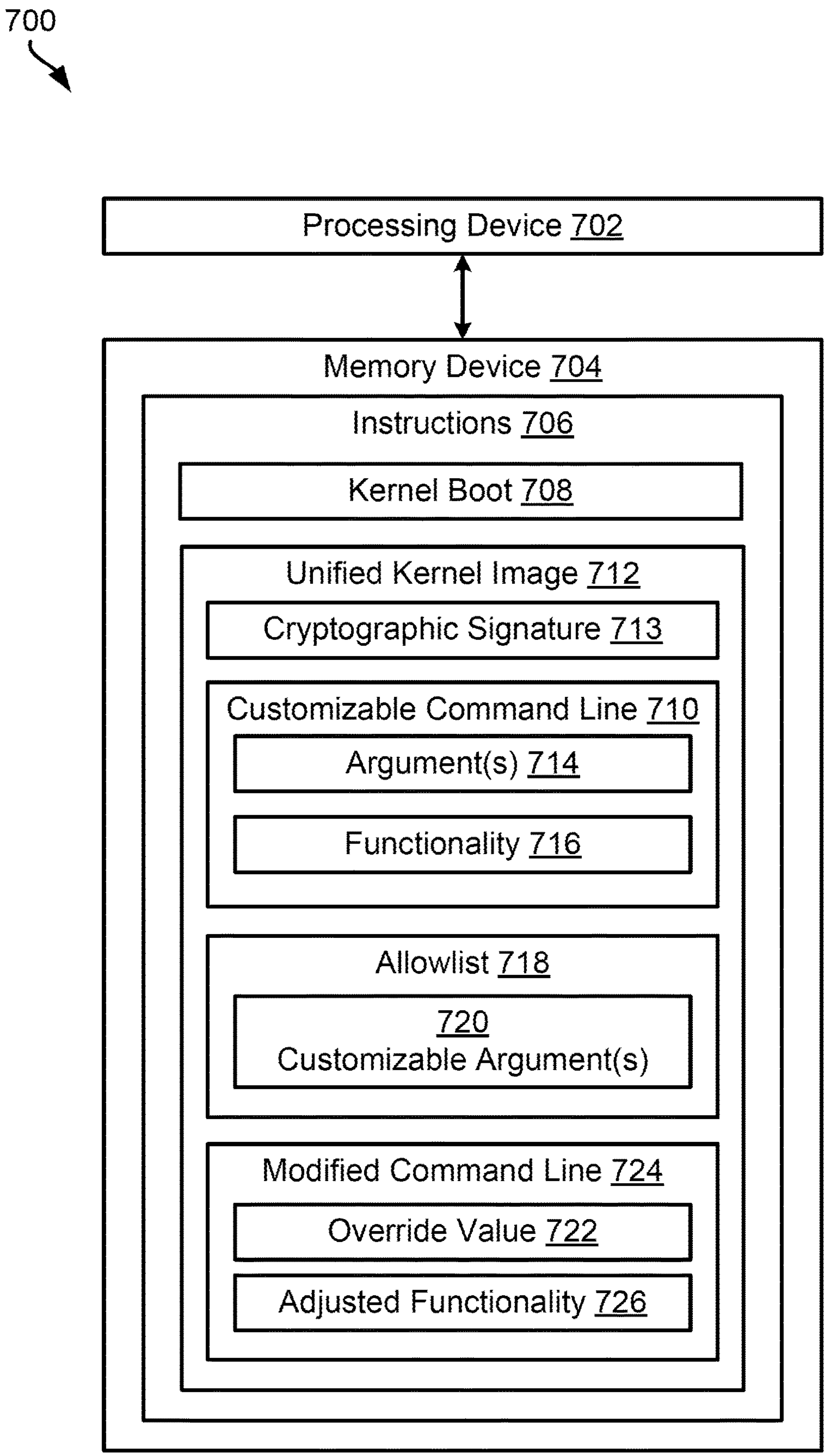
FIG. 7 is a block diagram of an example of a computing environment for a kernel boot using a customizable command line to implement customizable command line functionality according to one example of the present disclosure.

FIG. 7 is a block diagram of an example of a computing environment 700 for a kernel boot 708 using a customizable command line 710 to implement customizable command line functionality according to one example of the present disclosure. The computing environment 700 can include a processing device 702 communicatively coupled to a memory device 704.

The processing device 702 can include one processing device or multiple processing devices. The processing device 702 can be referred to as a processor. Non-limiting examples of the processing device 702 include a Field-Programmable Gate Array (FPGA), an application-specific integrated circuit (ASIC), and a microprocessor. The processing device 702 can execute instructions 706 stored in the memory device 704 to perform operations. In some examples, the instructions 706 can include processor-specific instructions generated by a compiler or an interpreter from code written in any suitable computer-programming language, such as C, C++, C#, Java, Python, or any combination of these.

The memory device 704 can include one memory device or multiple memory devices. The memory device 704 can be non-volatile and may include any type of memory device that retains stored information when powered off. Non-limiting examples of the memory device 704 include electrically erasable and programmable read-only memory (EEPROM), flash memory, or any other type of non-volatile memory. At least some of the memory device 704 includes a non-transitory computer-readable medium from which the processing device 702 can read instructions 706. A computer-readable medium can include electronic, optical, magnetic, or other storage devices capable of providing the processing device 702 with the instructions 706 or other program code. Non-limiting examples of a computer-readable medium include magnetic disk(s), memory chip(s), ROM, random-access memory (RAM), an ASIC, a configured processor, and optical storage.

In some examples, the processing device 702 can initiate the kernel boot 708 using a unified kernel image 712 containing the command line 710. The unified kernel image 712 can include a cryptographic signature 713 to indicate that the unified kernel image 712 is cryptographically signed. The command line 710 can include one or more arguments 714*a-c* that can be modified or replaced to adjust a functionality 716 of the command line 710. The signed unified kernel image 712 can include an allowlist 718 to indicate allowable values to modify the arguments 714*a-c*, customizable arguments 720 of the command line, or a combination thereof. The cryptographic signature 713 of the signed unified kernel image 712 can protect the allowlist 718 by establish trustworthiness of the allowlist 718. The customizable arguments 720 can be a portion or a subset of the arguments 714*a-c*. The processing device 702 can access a boot partition or another suitable storage location to identify an override value 722 to modify the customizable argument 720 of the command line 710.

Once the override value 722 is identified, the processing device 702 can create a modified command line 724 including the override value 722 as part of the customizable argument 720. Due to the override value 722 being included in the modified command line 724, the processing device 702 can execute the modified command line 724 to implement an adjusted functionality 726 of the modified command line 724. For example, the override value 722 may enable the adjusted functionality 726 with respect to an amount of time before an automatic reboot on kernel panic. Subsequent to executing the modified command line 724, the processing device 702 can complete the kernel boot 708.

Figure 8:
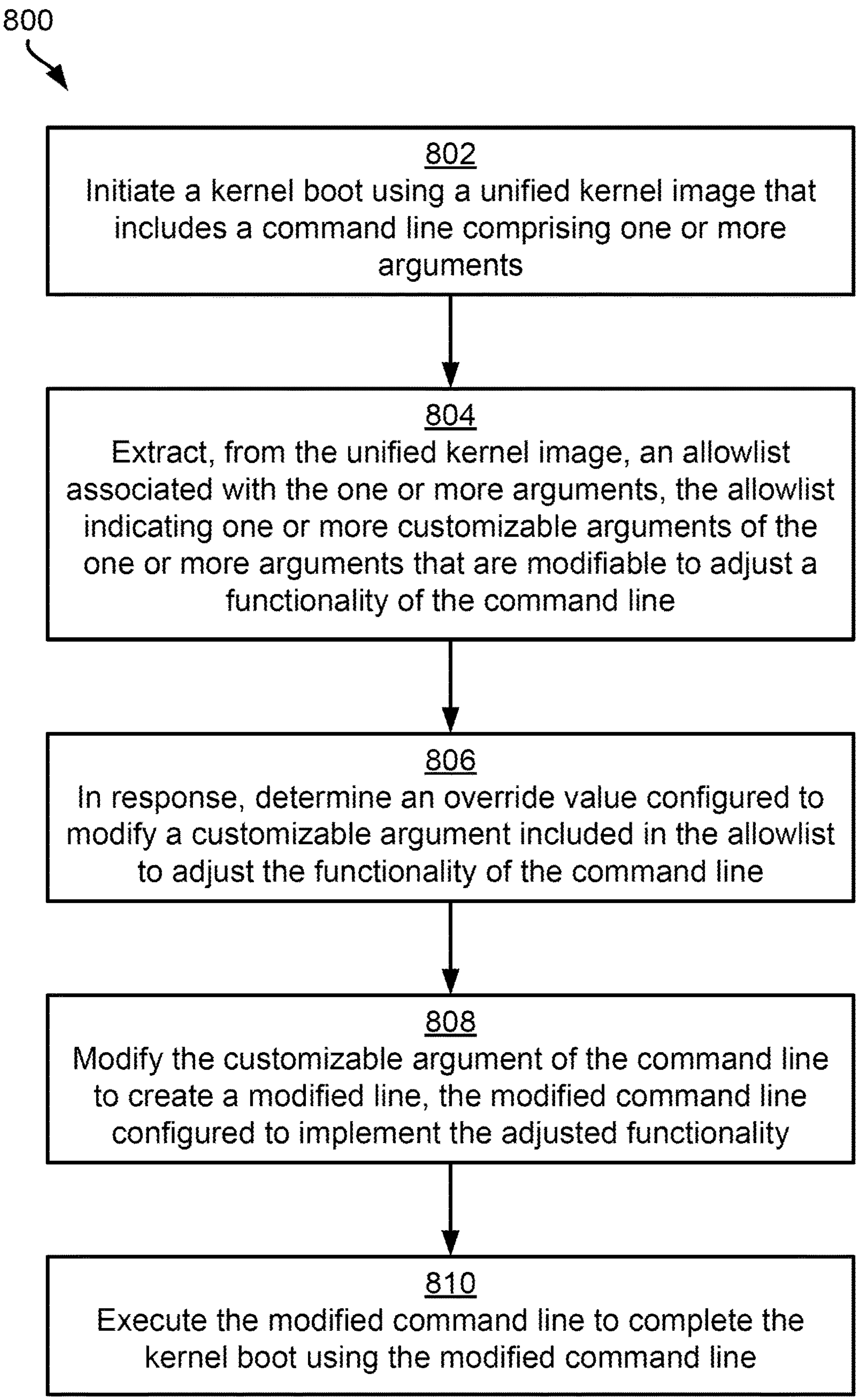
FIG. 8 is a flowchart of a process for a kernel boot using a customizable command line to implement customizable command line functionality according to one example of the present disclosure.

FIG. 8 is a flowchart of a process 800 for a kernel boot 708 using a customizable command line 710 to implement customizable command line functionality according to one example of the present disclosure. In some examples, the processing device 702 can perform one or more of the steps shown in FIG. 8. In other examples, the processing device 702 can implement more steps, fewer steps, different steps, or a different order of the steps depicted in FIG. 8. The steps of FIG. 8 are described below with reference to components discussed above in FIGS. 6-7.

In block 802, the processing device 702 initiates the kernel boot 708 using a unified kernel image 712 that can include the command line 710 having one or more arguments 714*a-c*. The unified kernel image 712 can be cryptographically signed with a cryptographic signature 713 to ensure security while having the command line 710 to enable customization through modifying one or more customizable arguments 720*a-b* of the arguments 714*a-c*. The arguments 714*a-c* can correspond to parameters of the command line 710 or the kernel boot 708. For example, the customizable arguments 720*a-c* can be modified to set an initialization order of one or more security modules. As another example, the customizable arguments 720*a-c* may be modified to force a usage of a predefined amount of memory during the kernel boot 708.

In block 804, the processing device 702 extracts, from the signed unified kernel image 712, the allowlist 718 associated with the arguments 714*a-c*. The allowlist 718 can indicate a customizable argument 720*a* of the arguments 714*a-c* that is modifiable to adjust the functionality 716 of the command line 710. When the processing device 702 initiates the kernel boot 708 at block 802, the processing device 702 can check to determine whether the allowlist 718 is available or present in the signed unified kernel image 712. In some examples, if the processing device 702 determines that the allowlist 718 is unavailable or not present in the signed unified kernel image 712, the processing device 702 may end the process 800 or avoid proceeding to block 806. In other examples, if the processing device 702 determines that the allowlist 718 is present and if an override capability is enabled at kernel build time, the processing device 702 can proceed to block 806.

In block 806, in response, the processing device 702 determines an override value 722 to modify the customizable argument 720*a* included in the allowlist 718 to adjust the functionality 716 of the command line 710. The override value 722 can be cryptographically signed or otherwise verifiable to ensure that the modified command line 724 created by modifying the command line 710 using the override value 722 is secure. In some examples, to determine whether the override value 722 is acceptable, the processing device 702 can compare the override value 722 with a list of permitted override values 630 that is stored in a boot partition 624.

If the processing device 702 determines that the override value 722 is excluded from the list of permitted override values 630, the processing device 702 can output an alert 634 to warn a user 626. For example, the processing device 702 may determine that all wildcard iterations of the override value 722 are excluded from the list of permitted override values 630. Alternatively, if the processing device 702 determines that the override value 722 is included in the list of permitted override values 630, the processing device 702 can modify the customizable argument 720*a* by appending the override value 722 to the command line 710.

In block 808, the processing device 702 modifies the customizable argument 720 of the command line 710 to create the modified command line 724. Due to the unified kernel image 712 being cryptographically signed or otherwise verified, the modified command line 724 can maintain a similar level of security while having customization afforded by the arguments 714. In some examples, the processing device 702 can modify the customizable argument 720 by adding the override value 722 to an existing argument value 620 of the customizable argument 720. In other examples, the processing device 702 may replace the existing argument value 620 using the override value 722. Once the processing device 702 creates the modified command line 724, the modified command line 724 can be executed to implement the adjusted functionality 726.

In block 810, the processing device 702 executes the modified command line 724 to complete the kernel boot 708 using the modified command line 724. Prior to executing the modified command line 724, the processing device 702 may implement a secure boot process to verify the cryptographic signature 713 of the signed unified kernel image 712. Verifying the signed unified kernel image 712 can establish trust of components (e.g., the modified command line 724, the allowlist 718, etc.) in the signed unified kernel image 712. After successfully verifying the signed unified kernel image 712, the processing device 702 can complete the kernel boot 708 using the modified command line 724.

As used below, any reference to a series of examples is to be understood as a reference to each of those examples disjunctively (e.g., "Examples 1-4" is to be understood as "Examples 1, 2, 3, or 4").

Example 1 is a non-transitory computer-readable medium comprising program code executable by a processing device for causing the processing device to perform operations comprising: initiating, by a boot loader, a kernel boot using a unified kernel image that is cryptographically signed with a cryptographic signature and includes two or more command lines that are protected by the cryptographic signature, the two or more command lines configured to implement different functionalities with respect to the kernel boot; extracting, by the boot loader, the two or more command lines from the signed unified kernel image, the two or more command lines including a command line selectable by a user to complete the kernel boot; and in response to the user selecting the command line, executing, by the boot loader, the command line of the two or more command lines to complete the kernel boot using the command line.

Example 2 is the non-transitory computer-readable medium of example(s) 1, wherein the signed unified kernel image containing the two or more command lines is cryptographically signed using a private key of a public-private key pair.

Example 3 is the non-transitory computer-readable medium of example(s) 1-2, wherein the signed unified kernel image comprises a first file section that stores the command line as a default command line and a second file section that stores a subset of the two or more command lines.

Example 4 is the non-transitory computer-readable medium of example(s) 1-3, wherein the second file section further comprises a respective human-readable sequence that describes each command line of the subset of the two or more command lines.

Example 5 is the non-transitory computer-readable medium of example(s) 1-3, wherein the default command line is a first command line, and wherein a second command line of the subset of the two or more command lines is executable to initiate a troubleshooting process associated with the kernel boot.

Example 6 is the non-transitory computer-readable medium of example(s) 1-5, wherein the signed unified kernel image comprises a respective file section that is cryptographically signed to store each of the two or more command lines, and wherein each file section of the signed unified kernel image comprises a respective human-readable sequence that describes the respective command line.

Example 7 is the non-transitory computer-readable medium of example(s) 1-6, wherein the operations further comprise: providing a boot loader interface to the user to select the command line of the two or more command lines, the boot loader interface displaying a respective human-readable sequence that describes the two or more command lines; and in response to the user selecting the command line, executing the command line to complete the kernel boot using the command line selected by the user via the boot loader interface.

Example 8 is a method comprising: initiating a kernel boot using a unified kernel image that includes a command line comprising one or more arguments, the unified kernel image being cryptographically signed with a cryptographic signature that covers the command line; extracting, from the signed unified kernel image, an allowlist associated with the one or more arguments, the allowlist being protected by the cryptographic signature and indicating one or more customizable arguments of the one or more arguments that are modifiable to adjust a functionality of the command line; in response, determining an override value configured to modify a customizable argument included in the allowlist to adjust the functionality of the command line; modifying the customizable argument of the command line to create a modified command line, the modified command line configured to implement the adjusted functionality; and executing the modified command line to complete the kernel boot using the modified command line.

Example 9 is the method of example(s) 8, wherein determining the override value comprises accessing a boot partition configured to store a specification file that provides the override value, and wherein the specification file is modifiable using user input.

Example 10 is the method of example(s) 8-9, wherein the override value comprises a series of alphanumeric characters inputted at least in part by a user as part of the user input.

Example 11 is the method of example(s) 8-10, wherein the allowlist further comprises a set of permitted override values that indicates allowable values to override the one or more arguments that are modifiable, and wherein the method further comprises: determining, using a rule set, that the override value is included in the set of permitted override values, wherein the rule set enables wildcard matching associated with the set of permitted override values; and in response, modifying the customizable argument of the command line using the override value to create the modified command line.

Example 12 is the method of example(s) 8-11, wherein the override value is a first override value configured to override a first argument of the command line, and wherein the method further comprises: determining that a second override value is excluded from the set of permitted override values, wherein the second override values is configured to override a second argument of the command line that is included in the allowlist; and in response, outputting an alert to indicate that the second override value is excluded from the set of permitted override values, wherein the alert results in a failure of the kernel boot.

Example 13 is the method of example(s) 8-12, wherein modifying the customizable argument of the command line further comprises replacing an existing argument value of the customizable argument with the override value.

Example 14 is the method of example(s) 8-13, wherein the customizable argument is a first argument configured to be overrode by a first override value, and wherein the method further comprises: identifying a second override value configured to override a second argument of the command line that is included in the allowlist; determining that the first override value is incompatible with the second override value; and in response, outputting an alert to indicate that the first override value is incompatible with the second override value, wherein the alert results in a failure of the kernel boot.

Example 15 is a system comprising: a boot loader configured to: initiate a kernel boot using a unified kernel image that includes a command line comprising one or more arguments, the unified kernel image being cryptographically signed with a cryptographic signature that protects the command line; extract, from the signed unified kernel image, an allowlist associated with the one or more arguments, the allowlist being protected by the cryptographic signature and indicating one or more customizable arguments of the one or more arguments that are modifiable to adjust a functionality of the command line; in response, determine an override value configured to modify a customizable argument included in the allowlist to adjust the functionality of the command line; modify the customizable argument of the command line to create a modified command line, the modified command line configured to implement the adjusted functionality; execute the modified command line to complete the kernel boot using the modified command line; and a boot partition configured to store a specification file including the override value.

Example 16 is the system of example(s) 15, wherein determining the override value comprises accessing the specification file stored in the boot partition, and wherein the specification file is modifiable using user input.

Example 17 is the system of example(s) 15-16, wherein the override value comprises a series of alphanumeric characters inputted at least in part by a user as part of the user input.

Example 18 is the system of example(s) 15-17, wherein the allowlist further comprises a set of permitted override values that indicates allowable values to override the one or more arguments that are modifiable, and wherein the boot loader is further configured to: determine, using a rule set, that the override value is included in the set of permitted override values, wherein the rule set enables wildcard matching associated with the set of permitted override values; and in response, modify the customizable argument of the command line using the override value to create the modified command line.

Example 19 is the system of example(s) 15-18, wherein the override value is a first override value configured to override a first argument of the command line, and wherein the boot loader is further configured to: determine that a second override value is excluded from the set of permitted override values, wherein the second override values is configured to override a second argument of the command line that is included in the allowlist; and in response, output an alert to indicate that the second override value is excluded from the set of permitted override values, wherein the alert results in a failure of the kernel boot.

Example 20 is the system of example(s) 15-19, wherein modifying the customizable argument of the command line further comprises replacing an existing argument value of the customizable argument with the override value.

Example 21 is a system comprising: a processing device; and a memory device including instructions that are executable by the processing device for causing the processing device to perform operations comprising: initiating a kernel boot using a unified kernel image that is cryptographically signed with a cryptographic signature and includes two or more command lines that are protected by the cryptographic signature, the two or more command lines configured to implement different functionalities with respect to the kernel boot; extracting the two or more command lines from the signed unified kernel image, the two or more command lines including a command line selectable by a user to complete the kernel boot; and executing the command line of the two or more command lines to complete the kernel boot using the command line.

Example 22 is the system of example(s) 21, wherein the signed unified kernel image containing the two or more command lines is cryptographically signed using a private key of a public-private key pair.

Example 23 is the system of example(s) 21-22, wherein the signed unified kernel image comprises a first file section that stores the command line as a default command line and a second file section that stores a subset of the two or more command lines.

Example 24 is the system of example(s) 21-23, wherein the second file section further comprises a respective human-readable sequence that describes each command line of the subset of the two or more command lines.

Example 25 is the system of example(s) 21-24, wherein the default command line is a first command line, and wherein a second command line of the subset of the two or more command lines is executable to initiate a troubleshooting process associated with the kernel boot.

Example 26 is the system of example(s) 21-25, wherein the signed unified kernel image comprises a respective file section that is cryptographically signed to store each of the two or more command lines, and wherein each file section of the signed unified kernel image comprises a respective human-readable sequence that describes the respective command line.

Example 27 is the system of example(s) 21-26, wherein the operations further comprise: providing a boot loader interface to the user to select the command line of the two or more command lines, the boot loader interface displaying a respective human-readable sequence that describes the two or more command lines; and in response to the user selecting the command line, executing the command line to complete the kernel boot using the command line selected by the user via the boot loader interface.

Example 28 is a method comprising: initiating a kernel boot using a unified kernel image that is cryptographically signed with a cryptographic signature and includes two or more command lines that are protected by the cryptographic signature, the two or more command lines configured to implement different functionalities with respect to the kernel boot; extracting the two or more command lines from the signed unified kernel image, the two or more command lines including a command line having one or more arguments; determining that an allowlist associated with the one or more arguments of the command line is available in the signed unified kernel image, the allowlist being protected by the cryptographic signature and indicating one or more customizable arguments of the one or more arguments that are modifiable to adjust a functionality of the command line; in response, determining an override value configured to modify a customizable argument included in the allowlist to adjust the functionality of the command line; modifying the customizable argument of the command line to create a modified command line, the modified command line configured to implement the adjusted functionality; and executing the command line or the modified command line to complete the kernel boot.

Example 29 is the method of example(s) 28, wherein the signed unified kernel image containing the two or more command lines is cryptographically signed using a private key of a public-private key pair.

Example 30 is the method of example(s) 28-29, wherein the signed unified kernel image comprises a first file section that stores the command line as a default command line and a second file section that stores a subset of the two or more command lines.

Example 31 is the method of example(s) 28-30, wherein determining the override value comprises accessing a boot partition configured to store a specification file that provides the override value, and wherein the specification file is modifiable using user input.

Example 32 is the method of example(s) 28-31, wherein the override value comprises a series of alphanumeric characters inputted at least in part by a user as part of the user input.

Example 33 is the method of example(s) 28-32, wherein the allowlist further comprises a set of permitted override values that indicates allowable values to override the one or more arguments that are modifiable, and wherein the method further comprises: determining, using a rule set, that the override value is included in the set of permitted override values, wherein the rule set enables wildcard matching associated with the set of permitted override values; and in response, modifying the customizable argument of the command line using the override value to create the modified command line.

Example 34 is the method of example(s) 28-33, wherein the override value is a first override value configured to override a first argument of the command line, and wherein the method further comprises: determining that a second override value is outside of the set of permitted override values, wherein the second override values is configured to override a second argument of the command line that is included in the allowlist; and in response, outputting an alert to indicate that the second override value is outside of the set of permitted override values, wherein the alert results in a failure of the kernel boot.

Example 35 is the method of example(s) 28-34, wherein modifying the customizable argument of the command line further comprises replacing an existing argument value of the customizable argument with the override value.

Example 36 is a system comprising: means for initiating a kernel boot using a unified kernel image that is cryptographically signed with a cryptographic signature and includes two or more command lines that are protected by the cryptographic signature, the two or more command lines configured to implement different functionalities with respect to the kernel boot; means for extracting the two or more command lines from the signed unified kernel image, the two or more command lines including a command line selectable by a user to complete the kernel boot; and means for executing the command line of the two or more command lines to complete the kernel boot using the command line.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A non-transitory computer-readable medium comprising program code executable by a processing device for causing the processing device to perform operations comprising:

initiating, by a boot loader, a kernel boot using a unified kernel image that is cryptographically signed with a cryptographic signature and includes:

two or more command lines that are protected by the cryptographic signature, the two or more command lines configured to implement different functionalities with respect to the kernel boot; and an allowlist stored in the signed unified kernel image as a signed file section and indicating a customizable argument of at least one command line of the two or more command lines that is modifiable by an override value to adjust a functionality of the at least one command line, the override value modifying the customizable argument by replacing or appending to an existing argument value of the customizable argument;

extracting, by the boot loader, the two or more command lines from the signed unified kernel image, the two or more command lines including a command line selectable by a user to complete the kernel boot; and in response to the user selecting the command line, executing, by the boot loader, the command line of the two or more command lines to complete the kernel boot using the command line.

2. The non-transitory computer-readable medium of claim 1, wherein the signed unified kernel image containing the two or more command lines is cryptographically signed using a private key of a public-private key pair.

3. The non-transitory computer-readable medium of claim 1, wherein the signed unified kernel image comprises a first file section that stores the command line selected by the user as a default command line and a second file section that stores a subset of the two or more command lines.

4. The non-transitory computer-readable medium of claim 3, wherein the second file section further comprises a respective human-readable sequence that describes each command line of the subset of the two or more command lines.

5. The non-transitory computer-readable medium of claim 3, wherein the default command line is a first command line, and wherein a second command line of the subset of the two or more command lines is executable to initiate a troubleshooting process associated with the kernel boot.

6. The non-transitory computer-readable medium of claim 1, wherein the signed unified kernel image comprises a respective file section that is cryptographically signed to store each command line of the two or more command lines, and wherein each file section of the signed unified kernel image comprises a respective human-readable sequence that describes the respective command line.

7. The non-transitory computer-readable medium of claim 1, wherein the operations further comprise:

providing a boot loader interface to the user to select the command line of the two or more command lines, the boot loader interface displaying a respective human-readable sequence that describes the two or more command lines; and in response to the user selecting the command line, executing the command line to complete the kernel boot using the command line selected by the user via the boot loader interface.

8. A method comprising:

initiating a kernel boot using a unified kernel image that includes a command line comprising one or more arguments, the unified kernel image being cryptographically signed with a cryptographic signature that covers the command line;

extracting, from the signed unified kernel image, an allowlist stored in the signed unified kernel image as a signed file section protected by the cryptographic signature, the allowlist indicating one or more customizable arguments of the one or more arguments that are modifiable to adjust a functionality of the command line;

in response to extracting the allowlist stored in the signed unified kernel image, determining an override value configured to modify a customizable argument of the one or more customizable arguments included in the allowlist to adjust the functionality of the command line, the override value modifying the customizable argument by replacing or appending to an existing argument value of the customizable argument;

modifying the customizable argument of the command line to create a modified command line, the modified command line configured to implement the adjusted functionality; and executing the modified command line to complete the kernel boot using the modified command line.

9. The method of claim 8, wherein determining the override value comprises accessing a boot partition configured to store a specification file that provides the override value, and wherein the specification file is modifiable using user input.

10. The method of claim 9, wherein the override value comprises a series of alphanumeric characters inputted at least in part by a user as part of the user input.

11. The method of claim 8, wherein the allowlist further comprises a set of permitted override values that indicates allowable values to override the one or more arguments that are modifiable, and wherein the method further comprises:

determining, using a rule set, that the override value is included in the set of permitted override values, wherein the rule set enables wildcard matching associated with the set of permitted override values; and in response, modifying the customizable argument of the command line using the override value to create the modified command line.

12. The method of claim 11, wherein the override value is a first override value configured to override a first argument of the command line, and wherein the method further comprises:

determining that a second override value is excluded from the set of permitted override values, wherein the second override value is configured to override a second argument of the command line that is included in the allowlist; and in response, outputting an alert to indicate that the second override value is excluded from the set of permitted override values, wherein the alert results in a failure of the kernel boot.

13. The method of claim 8, wherein the customizable argument is a first argument configured to be overrode by a first override value, and wherein the method further comprises:

identifying a second override value configured to override a second argument of the command line that is included in the allowlist;

determining that the first override value is incompatible with the second override value; and in response, outputting an alert to indicate that the first override value is incompatible with the second override value, wherein the alert results in a failure of the kernel boot.

14. The method of claim 8, further comprising, subsequent to initiating the kernel boot using the unified kernel image:

determining that the allowlist is available in the signed unified kernel image; and determining, using a set of argument names in the allowlist, the customizable argument.

15. A system comprising:

a boot loader configured to:

initiate a kernel boot using a unified kernel image that includes a command line comprising one or more arguments, the unified kernel image being cryptographically signed with a cryptographic signature that protects the command line;

extract, from the signed unified kernel image, an allowlist stored in the signed unified kernel image as a signed file section protected by the cryptographic signature, the allowlist indicating one or more customizable arguments of the one or more arguments that are modifiable to adjust a functionality of the command line;

in response to extracting the allowlist stored in the signed unified kernel image, determine an override value configured to modify a customizable argument of the one or more customizable arguments included in the allowlist to adjust the functionality of the command line, the override value modifying the customizable argument by replacing or appending to an existing argument value of the customizable argument;

modify the customizable argument of the command line to create a modified command line, the modified command line configured to implement the adjusted functionality;

execute the modified command line to complete the kernel boot using the modified command line; and a boot partition configured to store a specification file including the override value.

16. The system of claim 15, wherein determining the override value comprises accessing the specification file stored in the boot partition, and wherein the specification file is modifiable using user input.

17. The system of claim 16, wherein the override value comprises a series of alphanumeric characters inputted at least in part by a user as part of the user input.

18. The system of claim 15, wherein the allowlist further comprises a set of permitted override values that indicates allowable values to override the one or more arguments that are modifiable, and wherein the boot loader is further configured to:

determine, using a rule set, that the override value is included in the set of permitted override values, wherein the rule set enables wildcard matching associated with the set of permitted override values; and in response, modify the customizable argument of the command line using the override value to create the modified command line.

19. The system of claim 18, wherein the override value is a first override value configured to override a first argument of the command line, and wherein the boot loader is further configured to:

determine that a second override value is excluded from the set of permitted override values, wherein the second override value is configured to override a second argument of the command line that is included in the allowlist; and in response, output an alert to indicate that the second override value is excluded from the set of permitted override values, wherein the alert results in a failure of the kernel boot.

20. The system of claim 15, wherein the boot loader is further configured to, subsequent to initiating the kernel boot using the unified kernel image:

determine that the allowlist is available in the signed unified kernel image; and determine, using a set of argument names in the allowlist, the customizable argument.

* * * * *